United States Patent [19]
Fritzsche

[11] 3,720,155
[45] March 13, 1973

[54] FRYING APPARATUS WITH REMOTE CONTROL THERMOSTAT

[75] Inventor: Donald E. Fritzsche, Chicago Heights, Ill.

[73] Assignee: General Electric Company, Fort Wayne, Ind.

[22] Filed: March 22, 1972

[21] Appl. No.: 237,088

[52] U.S. Cl. .................. 99/337, 99/325, 99/403, 219/437, 219/442, 219/523
[51] Int. Cl. .................................................. A47j 37/00
[58] Field of Search......219/413, 425, 435, 442, 521, 219/523, 437; 99/325, 337, 403; 236/46

[56] References Cited

UNITED STATES PATENTS

| | | | |
|---|---|---|---|
| 2,756,425 | 7/1956 | Webber | 126/378 |
| 2,778,571 | 1/1957 | Gaddis | 236/46 |
| 2,778,920 | 1/1957 | Paveeka, Jr. | 219/437 |
| 2,805,314 | 9/1957 | Michaelis | 219/437 |
| 2,820,130 | 1/1958 | Dadson | 219/413 |
| 3,150,251 | 9/1964 | Kinney | 219/523 |
| 3,259,056 | 7/1966 | King | 99/325 |

Primary Examiner—Volodymyr Y. Mayewsky
Attorney—John M. Stoudt et al.

[57] ABSTRACT

A frying apparatus includes a support housing, an open top fat container, heating means for heating the fat in the container, and an escutcheon mounted above and behind the fat container. A thermostat, mounted in the escutcheon, is operatively connected to the heater for controlling energization of the heater. An electric motor unit is operatively connected to the thermostat for adjusting the setting of the thermostat upon energization of the motor. There is a circuit for connecting the motor unit to a suitable source of electric energy, including a manually operable switch. The switch is mounted in the housing forward of the open fat container.

4 Claims, 4 Drawing Figures

PATENTED MAR 13 1973  3,720,155

FRYING APPARATUS WITH REMOTE CONTROL THERMOSTAT

BACKGROUND OF THE INVENTION

This invention relates generally to frying apparatus and more particularly to such apparatus including a remote control thermostat.

Frying apparatus, such as deep fat frying machines, normally include a open top fat container and heating means, such as electric heating elements, which may be immersed in the fat container to heat the fat for frying food. For ease of cleaning of the elements and removal of food particles from the fat, it is become a general practice to mount the electric heating elements and the various controls for the frying apparatus, in an escutcheon or control head at the upper back of the apparatus. The heating elements and capillaries of the thermostats extend from the escutcheon into the fat container. The escutcheon is pivotally mounted so that the heating elements and thermostat capillaries may be pivoted out of the fat container. The fat container then may be removed from the housing. A typical apparatus providing for such convenient cleaning is illustrated and described in U.S. Pat. No. 2,805,314 - Harold A. Michaelis, assigned to General Electric Co., assignee of the present invention.

While such apparatus enhanced the cleaning operation, they require that the thermostat be mounted in the escutcheon. To mount the thermostat otherwise would require that the thermostat capillary tube be repeatedly bent as it is removed from the fat container. This would quickly cause the thermostat to fail. Such arrangements, however, have a drawback in that, in order to set the temperature to which the fat container is to be heated, the operator must reach across the open top fat container. When the apparatus is in use and the fat is hot this can result in the operator being burned if he is careless and touches a part of the apparatus. Also, when food is in the container being cooked, some fat may splatter and burn an operator reaching across the top of the fat container even though he does not touch any of the hot elements of the apparatus.

SUMMARY OF THE INVENTION

It is, therefore, an object of this invention to provide a deep fat frying apparatus including means for effectively setting or changing the setting of the control thermostat without the necessity of the operator reaching across the fat container.

It is another object of this invention to provide such a deep fat frying apparatus in which the heating and control elements are removable from the fat container so that the apparatus may be easily and quickly cleaned.

In carrying out the present invention in one form thereof, there is provided a frying apparatus comprising a support housing, an open top fat container arranged to receive food for cooking in the fat, heating means for heating the fat in the fat container, and an escutcheon mounted above and behind the fat container. Thermostat means is mounted in the escutcheon and operatively connected to the heating means for controlling the energization of the heating means. An electrically energizable motor unit is operatively connected to the thermostat means for adjusting the setting of the thermostat means upon energization of the motor unit. A circuit is provided for connecting the motor unit to a suitable source of electric energy, including manually operable switch means for selective energization of the motor upon actuation of the switch means. The switch means is mounted in the housing forward of the open top fat container.

DESCRIPTION OF THE PREFERRED EMBODIMENTS

Figure 1:
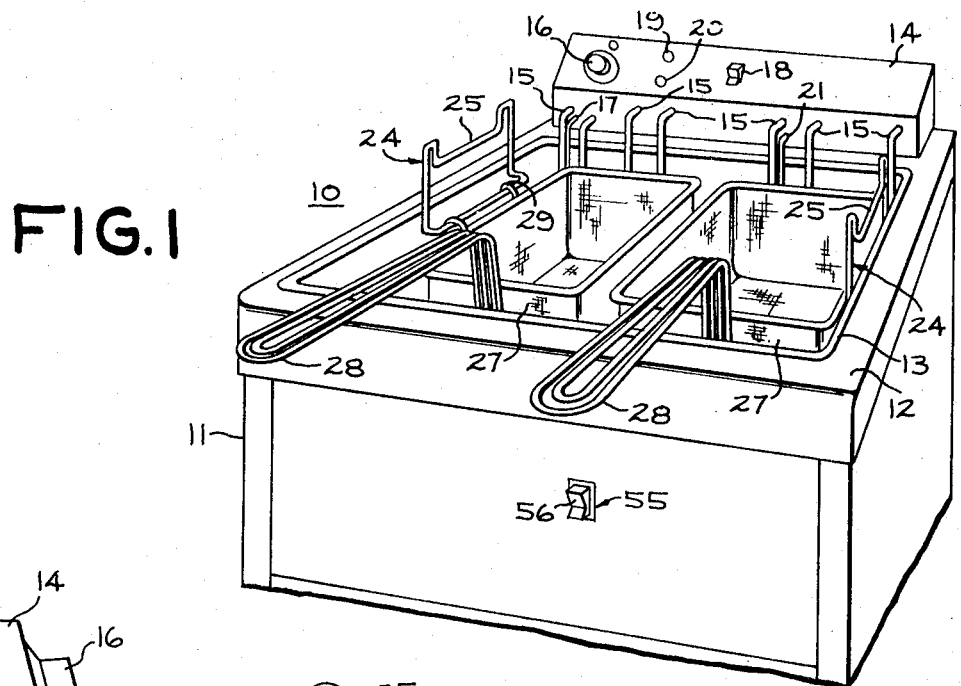
FIG. 1 is a partial prospective view of a frying apparatus incorporating one form of the present invention.
Figure 2:
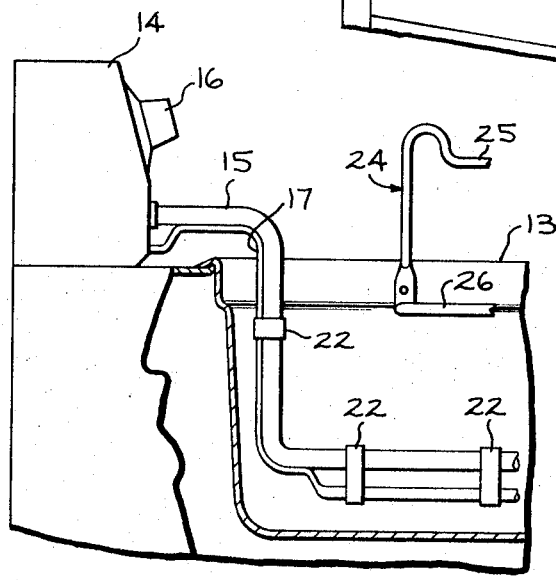
FIG. 2 is an enlarged, fragmentary side elevational view of a portion of the frying apparatus of FIG. 1, the view being partially in section.

Referring now particularly to FIGS. 1 and 2, a frying apparatus 10 includes a structurally rigid housing generally indicated in 11, having an upper panel 12. The upper panel or deck 12 is provided with an opening which receives an open top fat container or pan 13. The fat container fits down within the housing 11 so that thermal insulation is provided by the space between lateral walls of the housing and adjacent lateral walls of the fat container and thus the walls of the housing will not become excessively hot. A box like escutcheon or control head 14 is mounted on the upper deck at the rear thereof and, conveniently may be arranged to be swung between the position shown in FIG. 1 and second position in which it is tilted back. A suitable arrangement for providing such pivoting movement to the escutcheon is shown and described in the aforementioned Michaelis' patent. The control head is structurally constituted to serve as the mount or support for a plurality of electrical heating elements 15 which extend from the escutcheon down into the fat container 13 to heat fat therein for cooking food immersed in the fat.

The escutcheon also serves as a support for a control thermostat, the manual setting knob for which is illustrated at 16. The control thermostat conveniently may be of the fluid actuated type and its capillary 17 extends from the escutcheon into the fat container 13, and may be supported from one of the heating elements 15 by clips 22 as is well known in the art. The escutcheon also supports an on-off switch 18, an on-off indicator light 19, a heating indicator light 20 and a safety thermostat (not shown) whose capillary 21 also extends from the escutcheon into the fat container and is supported by one of the heating elements. A conventional control circuit for the frying apparatus is shown and described in the aforementioned Michaelis' patent and, for sake of simplicity will not be described in detail here. In such circuits the on-off button or switch 18 is utilized to energize and de-energize a circuit which includes the elements 15, the control thermostat, the safety thermostat and both the on-off indicator light 19 and the heater indicator light 20. When the circuit is energized electric energy is provided to the heating elements under control of the control thermostat so that the heating elements bring the fat in the fat container 13 up to the temperature set by the control thermostat and maintain it substantially at that temperature. The safety thermostat is set at a temperature higher than the highest operating temperature of the control thermostat so as to open the circuit and prevent overheating of the fat in the event that the control thermostat fails. The on-off indicator light 19 is on the entire time the circuit is energized while the heater indicator light is on only when the heating elements are energized and thus indicates that the temperature of the fat is below the temperature set by the control thermostat 16.

When the escutcheon is rotated to its other position as by means of a handle (not shown) attached to the heating elements. The heating elements 15 and the capillaries 17 and 21 are all rotated upwardly out of the fat container 13. The fat container then may be removed from the housing for cleaning. To this end, each side of the fat container pan 13 is provided with a handle 24. Each of the handles 24 includes an upper horizontal portion 25 and a lower horizontal portion 26. The user conveniently may grasp the upper horizontal portions 25 to lift the fat container out of the housing.

The actual cooking is done with one or more wire mesh baskets 27 each of which has a rigid wire framework arranged to support the basket and the food contained within the basket. Each basket has a strong handle portion 28 by which the baskets may be manipulated by the user and a elongated hook element 29. The upper horizontal portion 25, of handles 24 cooperate with hook elements 29 to mount the baskets 27 for draining hot fat from food in the baskets. To cook food in a basket 27, the basket is substantially immersed in the hot fat in pan 13. When the food has been completely cooked the basked may be raised and the hook 29 engaged with the upper horizontal portion 25. The upper horizontal portion 25 is is spaced sufficiently above the normal fat level in the container 13 that the bottom of the basket 27 will be above the fat and thus any excess fat on the food will drain back into the fat container. After the excess fat has drained back into container 13, the bakset may be taken off of the frying apparatus and the food removed from the basket.

When a frying apparatus as thus far described a user would have to reach across the open top of fat container 13 in order to manipulate the control knob 16 for setting or changing the setting of the control thermostat and also in order to effectively to turn off the heating elements 15, either by setting the control thermostat to a position that effectively de-energizes them or by manipulation of the on-off switch 18. This could create some danger for the operator when the frying apparatus is in operation and the fat in container 13 is hot. In accordance with the present invention the necessity to reach across the fat container 13 when apparatus 10 is energized is eliminated and yet, at the same time, the heating elements and thermostat capillaries are still removable from the fat container.

Figure 3:
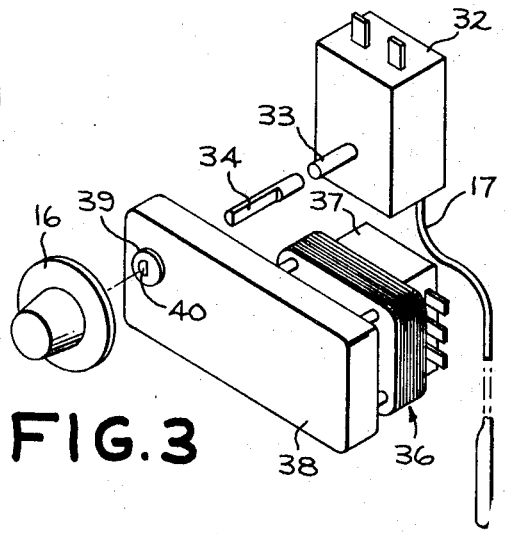
FIG. 3 is an exploded respective view of control thermostat, electric motor unit and manual control handle utilized in the frying apparatus of FIG. 1.

Referring now in particularly to FIG. 3 there are illustrated various details of the thermostat and drive motor unit used in the apparatus 10. Thermostat 32 conveniently is of the fluid actuated type in which one or more sets of contacts are actuated in response to temperatures sensed by capillary tube 17. A control shaft 33 extends from the thermostat and, as is well known in the art, rotation of shaft 33 will change the temperature setting of thermostat 32. The distal portion 34 of shaft 33 is cut away so as to be essentially D shaped in configuration. The end of shaft portion 34 is press fit within a D shaped opening (not shown) in control knob 16 so that rotation of control knob 16 will rotate shaft 33.

Also there is provided an electrically energizable thermostat drive motor unit generally indicated at 36. The motor unit may include a permanent-split capacitor reversible motor 37 and a gear reduction unit 38. The output shaft of the motor 37 is connected to the input of the gear reduction unit 38 and the output of the gear reduction 38 is in the form of a rotatable member or gear 39 which has an essentially D shaped opening 40 there through. Thus energization of the motor 37 will cause the output gear 39 to rotate, but at a somewhat slower speed than the motor because of the reduction effected by the gear reduction unit 38. The distal portion 34 of thermostat control shaft 33 is sufficiently long that it may be received in and extend through the D shaped opening 40 in gear 39 with a sufficient amount of it extending out of the output gear 39 to pass through the walls of escutcheon 14 and firmly receive control knob 16. The thermostat 32 and motor unit 36 are mounted within the escutcheon or control head 14 and the end of the distal portion of the control shaft 33 extends out of the escutcheon so that the manual control knob 16 is mounted to the shaft on the outside of the escutcheon.

With this arrangement energization of the motor 36 will rotate the control shaft 33 to change the setting of the thermostat 32. Conveniently the motor 37 is reversible so that, depending upon its mode of energization from a suitable source of electric energy the control shaft 33 will be rotated in different directions to either increase or decrease the temperature setting of the thermostat 32. It is desirable that the control knob 16 be manually rotatable so as to manually set the thermostat without having to physically disconnect the motor unit from the shaft 33 and it also is desirable that the motor unit not overdrive the thermostat; that is that the motor unit not apply excessive pressure to the shaft 33 when the thermostat is in either of its extreme settings. To this end the motor 37 may be of the permanent-split capacitor type with a relatively low torque the speed reduction unit may have a rather high gear ratio; for example about 500 to 1. Additionally so that the temperature setting of the thermostat by the motor may be exact and the motor may include a built-in brake so that the motor stops immediately upon the de-energization and a clutch which slips when the drive torque exceeds its rating. Both such a brake and such a clutch are well known in he art and these elements have not been shown in detail for the sake of simplicity and ease of understanding.

Figure 4:
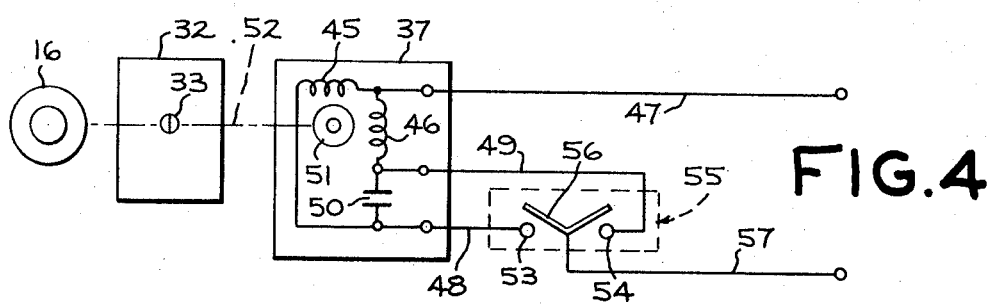
FIG. 4 is a schematic diagram of electric supply circuit for the motor unit of the apparatus of FIG. 1.

Referring now to FIG. 4 there is illustrated, in schematic form, an electric circuit for connecting the motor 37 to a suitable source of electric energy. The motor 37 includes a first winding 45 and a second winging 46. One end of each of the windings 45 and 46 is connected to a supply conductor 47. The other end of winding 45 is connected to a conductor 48 while the other end of winding 46 is connected to a conductor 49 and a capacitor 50 is connected between the conductors 48 and 49. The rotor of motor 37 is schematically illustrated at 51 and is connected to the control shaft 33 of thermostat 32 by the clutch, brake and gear reduction unit 38. This connection arrangement is schematically illustrated by the broken line 52. The other end of conductor 48 is connected to a first stationary contact 53 while the other end a conductor 49 is connected to a second stationary contact 54. The stationary contacts 53 and 54 are part of a manually operable switch 55 which also has a toggle member 56 that is connected to supply conductor 57. As is well known in the art, toggle member 56 is spring loaded to the open condition, as shown in FIG. 3, in which it does not contact either of the stationary contacts 53 or 54. By appropriate manual depression of the toggle member 56 it will contact either stationary contact 53 or stationary contact 54, depending on the direction of depression. Immediately upon being released the toggle member will move back to the position shown in FIG. 3.

When toggle member 56 is connected to stationary contact 53 a circuit for the motor winding 45 is provided from supply conductor 57 through toggle element 56, contact 53 and conductor 48 to the winding 45, the other end of winding 45, being connected to supply conductor 47. With this setting the circuit for winding 46 extends from supply conductor 57, through toggle element 56, contact 53, conductor 48, and capacitor 50 to the winding 46, the other end of the winding being connected to supply conductor 47. When the toggle member 56 is its other extreme position, that is in contact with stationary contact 54, the winding 46 is connected directly across the supply conductors 57 and 47 while the winding 45 is connected across the supply conductors in series with the capacitor 50. This reversal of the connections of the windings 45 and 46 between the depressed positions of toggle member 56 causes the rotor 51 to turn in a different direction, depending upon the direction of depression of toggle element 56.

Upon depression of the toggle element 56 in one direction or the other it will cause the rotor of motor 37 to rotate in a predetermined direction which in turn will rotate the control shaft 33 and change the temperature setting of the control thermostat 32. By making the conductors 48, 49 and 47 flexible they may extend from the escutcheon or control heat 14 to another location in the frying apparatus so that the switch 55 may be located remote from the motor unit 36 and thermostat 32, and repeated rotation of the escutcheon 14 will not deleteriously effect the conductors 47, 48 and 49. The switch 55 is mounted in the housing forward of the fat container 13 and preferably on the front surface of the housing 11, as shown in FIG. 1. With this arrangement the operator may conveniently change the temperature setting of the thermostat 32 by merely depressing the toggle element 56 in the appropriate direction without the necessity of reaching across hot fat when the frying apparatus is in operation. Since the circuit as illustrated in FIG. 3 selectively energizes the motor unit 36 to change the temperature setting of thermostat 32 without disturbing the operation of other control components of the frying apparatus it may be made completely independent of the basic control circuit and thus the switch 55 may be used to alter the temperature setting of control thermostat 32 regardless of whether the basic control circuit is energized. With the present arrangement the operator still has the option of changing the setting of control thermostat 32 by manual rotation of control knob 16.

While in accordance, with the patent statutes, there has been described what at present are to be considered the preferred embodiments of the present invention, it will be understood that various modifications may be made therein without departing from the invention and therefore it is intended in the appended claims to cover all such modifications as fall within the true spirit and scope of the invention.

What I claim is new and desire to secure by Letters Patent of the United States is:

1. A frying apparatus comprising:
   a. a rigid support housing;
   b. an open top fat supported in said housing and container arranged to receive food for cooking in the fat;
   c. heating means for electric heating the fat in said fat container,
   d. an escutcheon mounted above and behind said fat container;
   e. thermostat means mounted in said escutcheon and operatively connected to said heating means for controlling energization of said heating means;
   f. an electrically energizable motor unit operatively connected to said thermostat means for adjusting the setting of said thermostat means upon energization of said motor unit; and
   g. an electrical circuit for connecting said motor unit to a suitable source of electric energy, said circuit including manually operable electric switch means for selective energization of said motor upon actuation of said switch means;
   h. said switch means being mounted in said housing forward of said open top fat container.

2. A frying apparatus as set forth in claim 1 wherein said motor unit is reversible and said switch means is selectively operable to provide for operation of said motor unit in a selected direction for selectively increasing and decreasing the temperature setting of said thermostat means.

3. A frying apparatus as set forth in claim 1 wherein said thermostat means includes a control shaft for setting the control temperature of said thermostat upon relation of said control shaft; said motor unit being mechanically coupled to said control shaft for rotation of said shaft upon energization of said motor unit.

4. A frying apparatus as set forth in claim 3 wherein said control shaft extends out of said escutcheon; the distal end of said control shaft being provided with means for manually rotating said control shaft.

* * * * *